United States Patent
Treyer et al.

(10) Patent No.: US 10,050,732 B2
(45) Date of Patent: Aug. 14, 2018

(54) METHOD AND DEVICE FOR PROCESSING DATA IN AN OPTICAL NETWORK

(75) Inventors: Thomas Treyer, München (DE); Karl Kloppe, München (DE)

(73) Assignee: Xieon Networks S.a.r.l., Luxembourg (LU)

(*) Notice: Subject to any disclaimer, the term of this patent is extended or adjusted under 35 U.S.C. 154(b) by 92 days.

(21) Appl. No.: 13/505,643

(22) PCT Filed: Nov. 2, 2009

(86) PCT No.: PCT/EP2009/064433
§ 371 (c)(1),
(2), (4) Date: May 2, 2012

(87) PCT Pub. No.: WO2011/050855
PCT Pub. Date: May 5, 2011

(65) Prior Publication Data
US 2012/0219287 A1    Aug. 30, 2012

(51) Int. Cl.
*H04B 10/08* (2006.01)
*H04J 3/16* (2006.01)
*H04J 14/02* (2006.01)

(52) U.S. Cl.
CPC ........ *H04J 3/1694* (2013.01); *H04J 14/0278* (2013.01)

(58) Field of Classification Search
CPC .. H04J 14/0278; H04J 3/1694; H04J 14/0282; H04J 14/0232; H04J 14/0238; H04J 14/0267; H04J 14/025; H04J 14/0252; H04J 14/0258; H04J 14/0246; H04J 14/0226; H04J 14/0227; H04B 10/0793; H04B 10/07957
USPC ....................................................... 398/1–38
See application file for complete search history.

(56) References Cited

U.S. PATENT DOCUMENTS

| | | | |
|---|---|---|---|
| 7,046,929 B1 * | 5/2006 | Hester et al. ................... | 398/17 |
| 2004/0202468 A1 | 10/2004 | Harney | |
| 2006/0013584 A1 * | 1/2006 | Miyazaki ........................ | 398/19 |
| 2006/0115271 A1 | 6/2006 | Hwang et al. | |
| 2007/0092256 A1 * | 4/2007 | Nozue et al. ................... | 398/72 |
| 2008/0175588 A1 * | 7/2008 | Bernard et al. ................. | 398/17 |
| 2009/0016726 A1 * | 1/2009 | Suzuki et al. .................. | 398/79 |
| 2009/0060505 A1 * | 3/2009 | Bernstein ........... H04Q 11/0062 398/48 |  |

(Continued)

FOREIGN PATENT DOCUMENTS

EP    1796313 A1    6/2007

OTHER PUBLICATIONS

Written Opinion.
European Office Action, EP Application No. 09749070.0, dated Mar. 9, 2017, 3 pages.

*Primary Examiner* — Ken N Vanderpuye
*Assistant Examiner* — David Lambert
(74) *Attorney, Agent, or Firm* — Nelson Mullins Riley & Scarborough LLP

(57) ABSTRACT

A method and a device are provided for processing data in an optical network. The method includes the steps of events of a login scan are recorded by a first optical network element; the events are conveyed to a second optical network element; and the events are processed by the second optical network element. A communication system is described that includes the device.

15 Claims, 1 Drawing Sheet

(56) References Cited

U.S. PATENT DOCUMENTS

2009/0067832 A1 3/2009 De. Lew et al.
2009/0285106 A1* 11/2009 Bernard ............... H04L 41/065
　　　　　　　　　　　　　　　　　　　　370/242

* cited by examiner

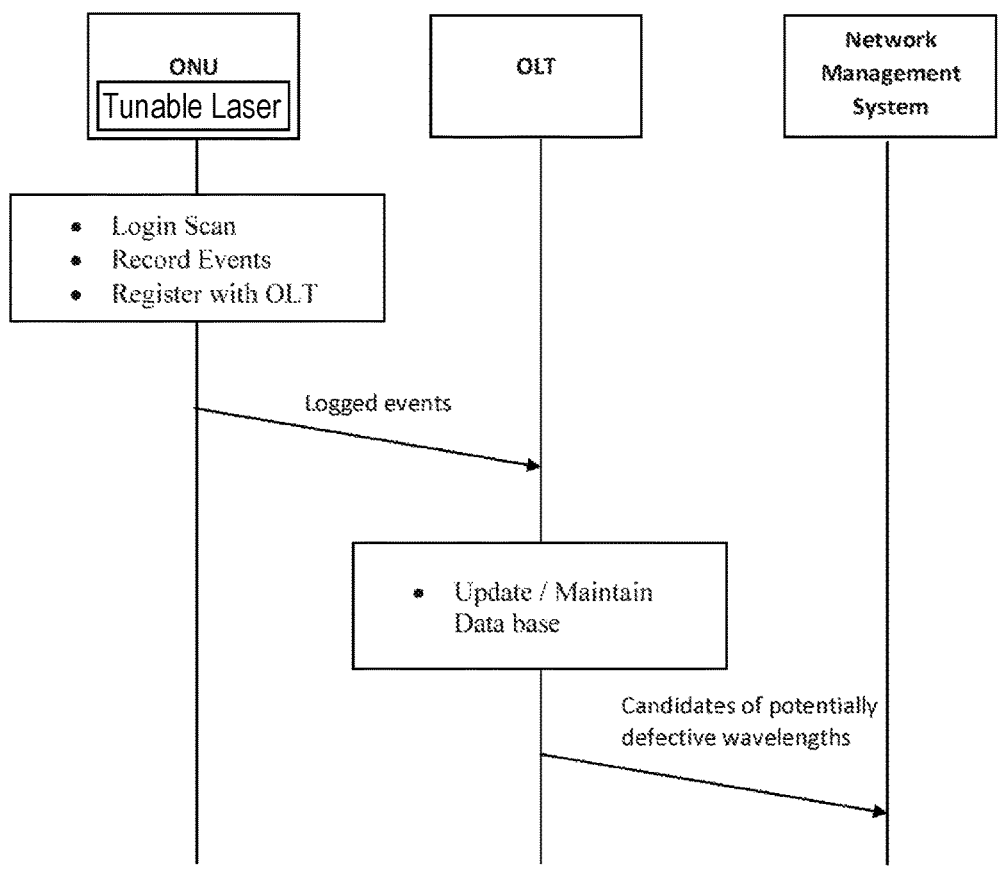

METHOD AND DEVICE FOR PROCESSING DATA IN AN OPTICAL NETWORK

BACKGROUND OF THE INVENTION

Field of the Invention

The invention relates to a method and to a device for processing data in an optical network.

A passive optical network (PON) is a promising approach regarding fiber-to-the-home (FTTH), fiber-to-the-business (FTTB) and fiber-to-the-curb (FTTC) scenarios, in particular as it overcomes the economic limitations of traditional point-to-point solutions.

The PON has been standardized and it is currently being deployed by network service providers worldwide. Conventional PONs distribute downstream traffic from an optical line terminal (OLT) to optical network units (ONUS) in a broadcast manner while the ONUS send upstream data packets multiplexed in time to the OLT. Hence, communication among the ONUS needs to be conveyed through the OLT involving electronic processing such as buffering and/or scheduling, which results in latency and degrades the throughput of the network.

In fiber-optic communications, wavelength-division multiplexing (WDM) is a technology which multiplexes multiple optical carrier signals on a single optical fiber by using different wavelengths (colors) of light to carry different signals. This allows for a multiplication in capacity, in addition to enabling bidirectional communications over one strand of fiber.

WDM systems are divided into different wavelength patterns, conventional or coarse and dense WDM. WDM systems provide, e.g., up to 16 channels in the 3rd transmission window (C-band) of silica fibers of around 1550 nm. Dense WDM uses the same transmission window but with denser channel spacing. Channel plans vary, but a typical system may use 40 channels at 100 GHz spacing or 80 channels at 50 GHz spacing. Amplification options enable the extension of the usable wavelengths to the L-band, more or less doubling these numbers.

Optical access networks, e.g., a coherent Ultra-Dense Wavelength Division Multiplex (UDWDM) network, are deemed to be the future data access technology.

Within the UDWDM concept, potentially all wavelengths are routed to each ONU. The respective wavelength is selected, e.g., by tuning a local oscillator (LO) laser at the ONU.

In a WDM-based PON, every ONU may lock to a distinct wavelength and the OLT may handle multiple wavelengths. In such a scenario, failures that relate to a single wavelength are difficult to be detected. If a wavelength cannot be used, the ONU may simply lock to another wavelength and the failure is concealed. This is in particular of disadvantage as the allocation of wavelengths may progress until the PON reaches its limit. Only then—if at all—is it possible to detected that a number of wavelengths is not utilized and hence the PON does not operate with the required efficiency.

BRIEF SUMMARY OF THE INVENTION

The problem to be solved is to overcome the disadvantages stated above and in particular to provide an efficient solution to become aware of and/or detect wavelength-specific failures in an optical network.

This problem is solved according to the features of the independent claims. Further embodiments result from the depending claims.

In order to overcome this problem, a method for processing data in an optical network is provided,
 (a) wherein events of a login scan are recorded by a first optical network element;
 (b) wherein the events are conveyed to a second optical network element;
 (c) wherein the events are processed by the second optical network element.

It is noted that the login scan may comprise a wavelength (or frequency) scan or a portion thereof conducted by the first optical network element. During such wavelength scan, the first optical network element tries to find an optical wavelength or an optical wavelength range that is not yet allocated and could be used for communication purposes.

The events may be actively transmitted to the second optical network element by the first optical network element or they may be polled from the first optical network element either by the second optical network element or by another element.

In case the first optical network element detects a wavelength of a wavelength range that is "free" and can be used for communication purposes, the first optical network element may allocate such wavelength(s) and indicate a successful registration to the second network element.

It is noted that the events may be conveyed towards the second optical network element in case of a successful registration of the first optical network element or in case of an unsuccessful registration. In the latter case, a different feedback channel from the first optical network element towards the second optical network element may be utilized.

For a stable network operation the operator thus is able to become aware of a status regarding all wavelength channels whether they are in use or not.

In a PON there are in particular three main reasons for wavelength-specific failures:
 The PON has a wavelength-selective attenuation due to optical filters;
 The transmitter in the OLT is deficient with regard to specific channels;
 The receiver in the OLT is faulty with regard to specific channels.

These reasons may lead to a wavelength that could not be successfully allocated by an ONU. The ONU may report an unsuccessful allocation to the OLT and, in particular in case several ONUS report the same defects regarding a particular wavelength or wavelength range, the OLT may indicate that this wavelength(s) is/are defective.

In an embodiment, the events comprise at least one of the following:
 a starting point of the login scan;
 a direction of the login scan;
 a change of direction of the login scan;
 an optical power detected at a particular wavelength scanned;
 an information indicating whether a signal detected could be decoded;
 a bit error rate of a decoded signal;
 a status information of a decoded signal;
 an information indicating a successful login;
 an information, in particular an error code, indicating an unsuccessful login attempt.

The events may be logged by the first optical network component and provided via a log file to the second optical network component. The first optical network component may be configured which events to record and which not to record. Recording of particular events may depend on other events: For example, if a signal can be decoded, the status information is added to the log file.

In another embodiment, the events are processed by the second optical network element by storing and/or updating a data base.

This data base could be a central or a local data base that is accessible to the second optical network element. Said data base may comprise a status information regarding wavelengths that could be used within the PON. Having collected information from several such optical network elements of the same type as the first optical network element, which are registered with the second optical network element, this data base may reflect a status of the wavelengths utilized and the ones that are potentially defective (in case one or several optical elements unsuccessfully tried to utilize such wavelengths). Based on events logged during the login procedure and being forwarded to the second network element, this second network element (by maintaining its data base) becomes aware of such potentially defective wavelengths.

In a further embodiment, a defective or a potentially defective wavelength is indicated towards a management system.

Hence, the second optical network element may indicate candidates of potentially defective wavelengths to a (network) management system. Counter-measures may be initiated before all wavelengths are allocated by optical network elements.

The first optical network element may scan an operational wavelength that cannot successfully be used for decoding a signal or that may result in an unsuccessful login attempt of the first optical network element.

It is noted that an operational wavelength (or range of wavelengths) may refer to wavelengths that could be utilized for a communication between the first optical network element and the second optical network element. The second optical network element may preferably be aware of its operational wavelengths.

A potentially defective wavelength can be a wavelength that is not recorded in the events logged by the first optical network element, albeit it should appear logged in such events. Such non-appearance may indicate a defect.

In a next embodiment, the potentially defective wavelength is reported to the management system if events from at least one additional optical network element indicate that this wavelength is potentially defective.

Hence, the second optical network element may assess the events reported from several optical network elements prior to reporting a potential defect of a wavelength, wavelength range or channel toward the management system. This significantly reduces the risk of a false alarm.

It is also an embodiment that the second optical network element marks a wavelength as alien wavelength in case it is not an operational wavelength for the second optical network element and in case it is recorded in the events reported by the first optical network element.

Hence, such wavelength may be operational for, e.g., a different OLT than the second optical network element. This alien wavelength may thus be operational, but not for this second optical network element.

Pursuant to another embodiment, the events are conveyed to the second optical network element via an OAM channel.

Hence, preferably such OAM channel can be set up between the first and second optical network elements after a successful registration of the first optical network element with the second optical network element.

It is noted that the events may also be conveyed via a (separate) feedback channel or they may be included in the user information that travels between the optical network elements.

According to an embodiment, the events are conveyed to the second optical network element after the first optical network element has successfully registered with the second optical network element.

According to another embodiment, the second optical network element determines a sub-range of wavelengths based on a wavelength or wavelength range that is used by the first optical network element to register with the second optical network element.

A total range of wavelengths could be sub-divided into several sub-ranges, wherein the first optical network element may only receive a portion of operational wavelengths. When the first optical network element has successfully registered with the second optical network element, the second optical network element determines which sub-range of wavelengths has been scanned by the first optical network element and thus may interpret the events logged by the first optical network element in view of the restriction that the first optical network element only receives this particular sub-range of wavelengths.

In yet another embodiment, the first network element is an optical network unit.

According to a next embodiment, the second network element is an optical line termination.

In particular, several ONUS may register with the OLT and utilize several of the OLT's operational wavelengths.

The problem stated above is also solved by an optical network element comprising a processing unit that is arranged to
  record events of a login scan;
  provide the events to a further optical network element, which is arranged to process the events.

This optical network element may be an ONU, wherein the further optical network element may be an OLT.

Pursuant to an embodiment, said further optical network element is a centralized optical network element that processes events from several distributed optical network elements.

The problem stated above is additionally solved by an optical network element comprising a processing unit that is arranged to process events that are provided by at least one distributed optical network element, wherein such events are recorded during a login scan of the at least one distributed optical network element.

The problem stated supra is further solved by a communication system comprising at least one optical network element as described herein.

Embodiments of the invention are shown and illustrated in the following FIGURE:

BRIEF DESCRIPTION OF THE SEVERAL VIEWS OF THE DRAWING

The FIGURE is a schematic diagram of a communication between an ONU and an OLT, wherein the ONU provides events that have been recorded during a login scan to the OLT.

DESCRIPTION OF THE INVENTION

In the approach presented a PON may comprise an OLT and several ONUS, which may register with the OLT.

Therefore, each ONU may scan a wavelength range (also referred to as spectral range) until it finds a wavelength to be used for communication purposes. This is also referred to as "login scan" conducted by the ONU.

The mechanism suggested herein in particular comprises the steps:
(a) The ONU logs (a selection of, in particular all) events during the login scan.
(b) The ONU uploads or conveys the logged events to the OLT. This may in particular be done after a successful login or registration of the ONU with the OLT.
(c) The OLT compares the logged events received with its internal data base.

Logging of Events:
The ONU may log the following events, e.g., during every scan:
  A start of the scan (scan position and/or direction);
  A change of the scan direction (e.g., at end of wavelength range);
  An optical input power detected at a particular wavelength;
  A signal (or a collection of signals) that could (or could not) be decoded from input data;
  If the signal can be decoded, a bit error rate is checked (e.g., whether or not the bit error rate is within an acceptable range);
  If the signal can be decoded, a status information of the decoded signal (e.g., information set provided by the signal or a combination of signals, like e.g., wavelength allocated or not allocated);
  If the signal can be detected and the wavelength is not allocated (i.e. free), a login of the ONU is logged; hence a success of such login may be monitored or a error code may be monitored in case of an unsuccessful login attempt.

Uploading the Logged Events to the OLT:
When the ONU successfully registers with the OLT, a bidirectional OAM channel can be (set up and) utilized. The OLT may use this OAM channel to read the ONU's event log or the events may be transferred from the ONU to the OLT. After the logged events are read by or transferred to the OLT, the logged events may be erased at the ONU.

Processing of Logged Events by the OLT:
(A) Identifying the Scan Range:
  The OLT may process the events logged by the ONU to determine a wavelength range, which has been scanned by the ONU. It may depend on the ONU for the OLT to determine such wavelength range. If the ONU comprises a tunable laser with a high reproducibility, the wavelength may be provided directly by the logged events. If, on the other hand, the ONU has a tunable laser with large tolerances and a poor reproducibility, the ONU itself may not be able to determine its absolute scan positions and may provide relative scan positions only together with the scan direction and the scan speed. In this case, the OLT may estimate the ONU's wavelength range that has been scanned by the ONU. Advantageously, such estimation may be done in a conservative manner in order to avoid that the estimated wavelength range exceeds the actual wavelength range.
  A typical scan operation of an ONU passes multiple wavelengths, which may be in use or reserved. Every such wavelength allows any type of ONU to identify the scan position, because the wavelength is identified by read-only status bits of the downstream signal. Therefore the OLT may derive the actual scan path of the ONU based on the events logged by the ONU.

(B) Checking for Missing Wavelengths:
  After the OLT has been provided with the scan range (or the scan path) of the ONU, the OLT compares this scan path with its internal data base comprising wavelengths that are active or operational.
  If there is an operational wavelength in this list of the OLT, which is not mentioned in the ONU's log, this wavelength can be marked as "Suspected for transmitter/PON failure" in the OLT data base. If this failure is confirmed by other ONUS, the failure can be reported to the management system.

(D) Checking for Alien Wavelengths:
  If the events logged by the ONU include wavelengths with no entry in the OLT's list of operational wavelengths, this wavelength can be marked as "Alien wavelength" in the OLT data base. Alien wavelengths can be logged, but may not be treated as failure condition.

(E) Checking for Unreadable Wavelengths:
  If the ONU has scanned across an operational wavelength, but was not able to decode the signal, this wavelength is marked as "Suspected for transmitter/PON failure" in the OLT data base. If this failure is confirmed by other ONUS, the failure can be reported to the management system.

(F) Checking for Unsuccessful Logins:
  The OLT checks the ONU's logged events for unsuccessful logins. In case an unsuccessful login is found, the respective wavelength can be marked as "Suspected for Receiver failure" in the OLT data base. If this failure is confirmed by other ONUS, the failure can be reported to the management system.

(G) Consideration of Optical Filters:
  In a WDM PON optical filters can be used to divide the complete wavelength range into multiple sub-ranges. Hence, the ONU may not receive all operational wavelengths. Therefore the OLT may use the wavelength of the successful login of the ONU to determine this ONU's specific optical sub-range. Consequently, the OLT does not expect the ONU to "see" any wavelength beyond its sub-range.

FIG. 1 shows a schematic diagram of a message chart. An ONU conducts a login scan and records events. After the ONU has found a wavelength to use, it registers with the OLT. The ONU provides the logged events to the OLT, which updates or maintains its data base.

Further Advantages

An implementation of the approach provided does not require additional hardware resources. The ONU's software may supply the log of scanning events. The OAM protocol between the ONU and the OLT may utilize a (sub-)protocol to upload the log and the OLT may require the described correlation method to determine channels that are potentially defective.

Advantageously, a failure detection of OLT and PON hardware is provided in advance to the defective component or resource being required. Without this approach any channel-specific failure would be concealed within the PON until all channels of the PON are required. Not until then it becomes clear that some channels are defective. The proposal provided allows detecting such defect earlier and initiating counter-measures.

LIST OF ABBREVIATIONS

AWG Arrayed Wave Guide
NGOA Next Generation Optical Access
OAM Operation, Administration and Maintenance
OLT Optical Line Termination (carrier side)
ONU Optical Network Unit (subscriber side)
PON Passive Optical Network
UDWDM Ultra-Dense WDM
WDM Wavelength Division Multiplex

The invention claimed is:

1. A method for processing data in an optical network, the method which comprises:
   (a) recording events of a login scan for an attempt to login by a first optical network element, wherein the login scan comprises a wavelength or frequency scan of wavelengths available for communication with a second optical network element conducted by the first optical network element to find an optical wavelength or an optical wavelength range among the wavelengths available for communication with the second optical network element that is not yet allocated and could be used by the first optical network element for communication with the second optical network element, said login scan being realized by tuning a tunable device in the first optical network element to scan over wavelengths in a range of the wavelengths available for communication with the second optical network element;
   (b) conveying the events to the second optical network element; and
   (c) processing the events by the second optical network element to identify at least one defect or a potential defect associated with using one of the wavelengths available for communication; and
   (d) based on the processing, indicating the identified at least one defect or potential defect to a network management system, so that counter-measures can be initiated before all wavelengths of the wavelengths available for communication with the second optical network element are allocated.

2. The method according to claim 1, wherein the events comprise at least one of the following:
   a starting point of the login scan;
   a direction of the login scan;
   a change of direction of the login scan;
   an optical power detected at a particular wavelength scanned;
   an information indicating whether a signal detected could be decoded;
   a bit error rate of a decoded signal;
   a status information of a decoded signal;
   an information indicating a successful login; and
   an item of information indicating an unsuccessful login attempt.

3. The method according to claim 2, wherein the item of information is an error code.

4. The method according to claim 1, wherein the step of processing the events by the second optical network element comprises storing the events and/or updating a data base.

5. The method according to claim 1, which comprises reporting the identified at least one potential defect to the network management system if events from at least one additional optical network element indicate that there is a potential defect associated with using the wavelength for communication.

6. The method according to claim 3, wherein the second optical network element marks a wavelength as alien wavelength in case the wavelength is not an operational wavelength for the second optical network element and in case the wavelength is recorded in the events reported by the first optical network element.

7. The method according to claim 1, which comprises conveying the events to the second optical network element via an OAM channel.

8. The method according to claim 1, which comprises conveying the events to the second optical network element after the first optical network element has successfully registered with the second optical network element.

9. The method according to claim 1, which comprises determining with the second optical network element a sub-range of wavelengths based on a wavelength or wavelength range that is used by the first optical network element to register with the second optical network element.

10. The method according to claim 1, wherein the first network element is an optical network unit.

11. The method according to claim 1, wherein the second network element is an optical line termination.

12. An optical network element in an optical network that includes elements, comprising:
    a processing unit configured to:
    record events of a login scan to attempt to login the optical network element, wherein the login scan comprises a wavelength or frequency scan of wavelengths available for communication with a further optical network element conducted by the optical network element to find an optical wavelength or an optical wavelength range among the wavelengths available for communication with the further optical network element that is not yet allocated and could be used by the optical network element for communication with the further optical network element, said login scan being realized by tuning a tunable device in the optical network element to scan over wavelengths in a range of the wavelengths available for communication with the further optical network element; and
    provide the events to the further optical network element configured to process the events to identify at least one defect or a potential defect associated with using one of the wavelengths available for communication, said events being indicative of the identified at least one defect or potential defect so that counter-measures can be initiated before all wavelengths are allocated of the wavelengths available for communication with the further optical network element.

13. The optical network element according to claim 12, wherein the further optical network element is a centralized optical network element disposed to process events from a plurality of distributed optical network elements.

14. An optical network element, comprising:
    a processing unit configured to:
    process events that are provided by at least one distributed optical network element to identify at least one defect or a potential defect associated with using one of wavelengths available for communication, wherein the events are recorded during a login scan for an attempt to login by the at least one distributed optical network element, wherein the login scan scans optical wavelengths available for communication with the optical network element to locate one or more optical wavelengths that are not yet allocated for communication with the optical network element, said login scan being realized by tuning a tunable device in the distributed optical network element to scan over wavelengths in a range of the wavelengths available for communication with the optical network element; and in response to the processing of the events, indicate the identified at least one defect or potential defect to a network management system, so that counter-measures can be initiated before all wavelengths are allocated by optical network elements in the optical network.

15. A communication system, comprising at least one optical network element according to claim 12 or 14.

* * * * *